Sept. 1, 1925.

H. J. LOVENSTON 1,551,995

DEVICE FOR DETERMINING ANGLES

Filed Sept. 8, 1919

INVENTOR.
Hans J. Lovenston
BY
Arthur B. Jenkins,
ATTORNEY.

Patented Sept. 1, 1925.

1,551,995

UNITED STATES PATENT OFFICE.

HANS J. LOVENSTON, OF HARTFORD, CONNECTICUT.

DEVICE FOR DETERMINING ANGLES.

Application filed September 8, 1919. Serial No. 322,392.

*To all whom it may concern:*

Be it known that I, HANS J. LOVENSTON, a subject of the Government of Germany, residing in Hartford, in the county of Hartford and State of Connecticut, have invented a new and Improved Device for Determining Angles, of which the following is a specification.

My invention relates to the class of devices above named, and an object of my invention, among others, is to provide a device with the use of which angles may be accurately determined in a simple and efficient manner.

One form of instrument embodying my invention and in the construction and use of which the objects herein set out, as well as others, may be attained, is illustrated in the accompanying drawings, in which—

Figure 1:
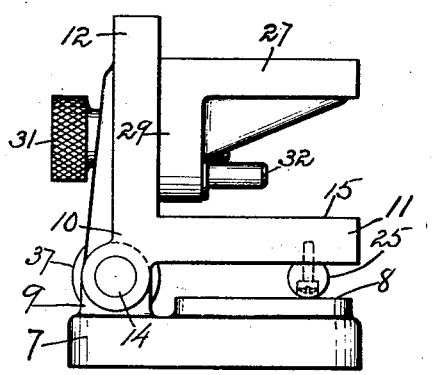
Figure 1 is a view in side elevation of my improved device.
Figure 2:
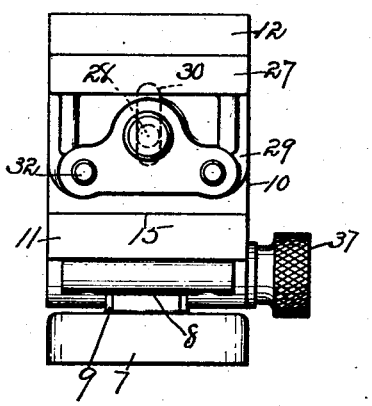
Figure 2 is a view in front elevation of the same.
Figure 3:
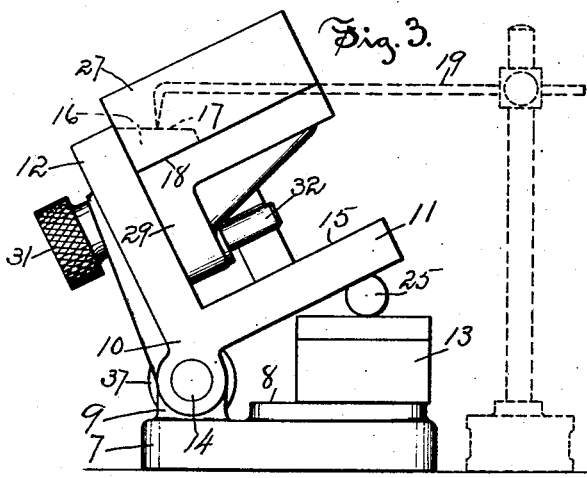
Figure 3 is a view in side elevation showing the application of the instrument.

In the accompanying drawings the numeral 7 indicates the base of my improved instrument having a top surface 8 of special form and arrangement and a lug 9 to which a sine fixture 10 is pivotally secured, said fixture in one form being an angle iron comprising a sine base 11 and an upright 12. The top surface 8 of the base 7 and the sine base 11 are so formed, and the pivot 14 for attachment of the sine base to the base 7 is so arranged that by placing gage blocks 13, of different thicknesses and each having a predetermined value, between the base and a sine rest 25 that is secured to the sine base in any suitable manner the angle of the determining surface 15 of the sine base with respect to the surface 8 will be definitely known. A piece of work 16 with an angularly formed surface 17 having been placed upon the sine base 11 and the latter having been placed in the same angular position with respect to the surface 8 as it is intended the surface 17 shall bear with respect to the bottom 18 of the piece of work, the feeler 19 of a surface gage may be employed to determine whether the surface 17 is parallel with the bottom surface of the base 7 and hence with the surface 8, and if so it will be determined that the angular disposition of the surface 17 with respect to the surface 15 and hence the bottom of the work is correct.

Figure 5:
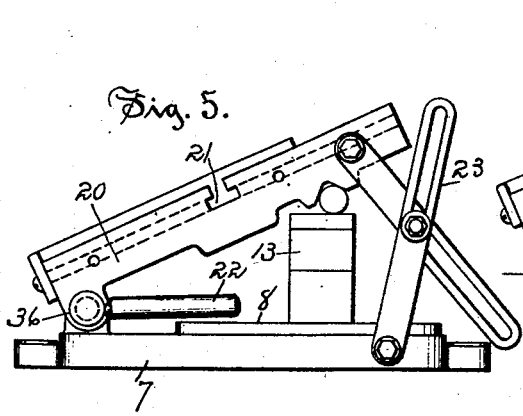
Figure 5 illustrates another form of device showing my invention, one of the sides being removed.

If desired the piece of work 16 may be secured to the base and the surface 17 may be cut as by a planer tool and in adapting my invention for this purpose I provide a sine base 20 pivotally secured to its base 7 and having T-shaped slots 21 by means of which the piece of work may be clamped in place as by the use of a milling machine vise secured in said slots in a manner that will be readily understood. Furthermore as shown in Figure 5 of the drawings, an end piece is shown as secured by screws and one side piece is shown, and it is secured in a similar manner, the opposite side piece being removed. In this form of the device a handle 22 may be employed for tilting the base 20, and slotted arms 23 are provided for holding the base 20 in different angular positions.

Figure 6:
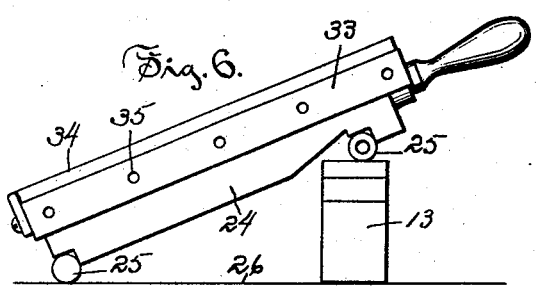
Figure 6 illustrates still another form of device embodying my invention, one of the sides being removed.

In a simpler form of the device, and as illustrated in Figure 6, the sine base 24 is provided at or near its pivotal end with sine rests 25, the base, however, being free to be placed upon a surface 26 in any position, the blocks 13 being employed as hereinbefore described.

Figure 4:
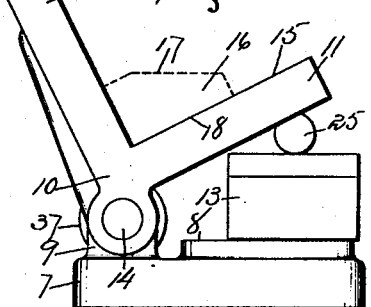
Figure 4 is a view in side elevation showing a different manner of its use from that illustrated in Figure 3.

In that form of device illustrated in Figures 1 to 4 my improved sine fixture is in the shape of an angle iron, the upright 12 serving as a rest against which the edge of a piece of work on the base 11 may be placed as especially illustrated in Figure 4. My invention also contemplates a compound sine fixture in which a supplemental sine base 27 is pivotally attached to the upright 12, as by means of a pivot 28 extending through a slot 30 in a back piece 29 and secured as by a thumb nut 31. The angular positions of the sine base 27 are determined by means of the gage blocks 13 that may be placed underneath sine rests 32 in the form of pins projecting from the front face of the back piece 29.

A simpler form of my device, as illustrated in Figure 6, embodies a surface plate 33 rigidly secured to the sine base 24, this plate having means, as sides 34, that may be secured as by means of screws in holes 35 in the edges of the plate 33, for retaining a piece of work in place on its surface. There are two rests 25, one located at the pivot end of the fixture and the other at the free or movable end and they are so relatively shaped or formed, in a manner that will be readily understood, that in the use of the device the angular position of the surface plate is determined by the use of gage blocks, and the plate affords means for receiving a piece of work, the angular disposition of a surface on which may be readily determined.

In the arrangement of the device as shown in Figure 5, the lower pivot rest that corresponds to the pivot rest 25 in the device of Figure 6, is actually a pivot 36 so formed that its action and the results obtained thereby are the same as that of an unfixed rest 25, as shown in Figure 6.

Prior to my invention it has been common practice to employ a support for a piece of work having an angular surface to be gaged, or a surface to be angularly formed, to which support said piece of work is secured and by which it is supported, a sine bar and gage blocks being employed to determine when the piece of work is in the proper position or to determine the angular form of a piece of work that has been shaped, but my improved device contemplates means whereby not only the angular position of a piece of work may be determined, but by means of which it may be supported to be cut to shape and to determine the angular position of a surface thereon. I also provide each of the devices with means for securing the sine base against pivotal movement when a correct position thereof has been obtained, this means consisting of a clamp nut 37 in the devices illustrated in Figures 1 to 4 of the drawing, and the arms 23 and the means for securing them as shown in Figure 5.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A support, a sine base having means for retaining a piece of work thereon, means for pivotally supporting the base at one end on said support, and means for positioning the other end of the base to determine the angular position of the upper surface thereof with respect to said support.

2. A support, a sine base having means to rigidly support a piece of work at its upper surface on said support, means for pivotally supporting the base at one end, and means for positioning the other end of the base to determine the angular position of the upper surface thereof with respect to said support.

3. A support, a sine base having means to retain a piece of work thereon, a support for pivotal attachment of one end of the base fixed with respect thereto, and means for positioning and supporting the other end of the base to determine the angular position of the upper surface thereof with respect to said support.

4. A support, a sine fixture comprising a base and an upright extending therefrom to retain a piece of work thereon, means for pivotally attaching the base at one end on said support, and means for positioning and supporting the other end of the base to determine the angular position of the upper surface thereof with respect to said support.

5. A sine fixture comprising a base piece having means to receive gage blocks, a sine base, rests for opposite ends of said sine base, one of said rests constituting a pivot to secure the sine base to the base piece, an upright extending at right angles from the sine base to retain a piece of work thereon.

6. A sine fixture comprising a sine base having a plain upper surface, an upright extending from said base, and a second sine base pivotally secured to said upright on an axis extending parallel with the upper surface of the first mentioned sine base.

7. A sine fixture comprising a sine base having a plain upper surface, rests for the opposite ends of said sine base, an upright extending from said base at right angles to its upper surface, and a second sine base pivotally secured to said upright on an axis extending parallel with the upper surface of the first mentioned sine base.

8. A sine fixture comprising a base piece, a sine base pivotally secured to the base piece, means for determining the angular position of said sine base with respect to said base piece, an upright extending from said base piece at right angles thereto, and a second sine base pivotally secured to said upright.

9. A sine fixture comprising a base piece, a sine base pivotally secured to said base piece, means for determining the angular position of said sine base with respect to said base piece, an upright extending from said sine base, and a second sine base pivotally secured to said upright.

10. A support, a sine base comprising a rigid member adapted to rigidly support a piece of work for reducing operations while so supported, means for pivotally supporting said base at one end on said support, and means for positioning the other end of the base to determine the angular position of the upper surface thereof with respect to a surface upon which said supporting means rests.

11. A sine fixture comprising a support base piece, a sine base pivotally secured to said support to overlie the same, and a second sine base pivotally secured to said first mentioned sine base to overlie the first mentioned sine base.

12. A sine fixture comprising a base piece, a sine base pivotally secured to the base piece, an upright on said sine base, a second sine base pivotally secured to said upright, and means for determining the angular position of both of said sine bases one with respect to the other.

HANS J. LOVENSTON.